United States Patent
Aoki et al.

[19]

[11] Patent Number: 5,908,022
[45] Date of Patent: Jun. 1, 1999

[54] FUEL-INJECTION CONTROL DEVICE FOR A DIESEL ENGINE

[75] Inventors: Sigeru Aoki, Susono; Tosiyuki Maehara, Toyota, both of Japan

[73] Assignee: Toyota A. Aoki & Associates, Aichi, Japan

[21] Appl. No.: 08/748,436

[22] Filed: Nov. 13, 1996

Related U.S. Application Data

[63] Continuation of application No. 08/227,159, Apr. 13, 1994.

[30] Foreign Application Priority Data

Apr. 16, 1993 [JP] Japan .................................. 6-90081

[51] Int. Cl.$^6$ ................................................ F02M 37/04
[52] U.S. Cl. ......................................... 123/569; 123/456
[58] Field of Search ................................ 123/569, 571, 123/497, 499, 456

[56] References Cited

U.S. PATENT DOCUMENTS

| | | | |
|---|---|---|---|
| 4,426,981 | 1/1984 | Greiner | 123/569 |
| 4,466,416 | 8/1984 | Kawamura | 123/569 |
| 4,471,745 | 9/1984 | Yoshioka | 123/569 |
| 4,625,702 | 12/1986 | Onishi | 123/569 |
| 4,644,926 | 2/1987 | Sakurai | 123/569 |
| 5,150,694 | 9/1992 | Currie | 123/569 |
| 5,186,138 | 2/1993 | Hashimoto | 123/456 |
| 5,201,306 | 4/1993 | Iiyama | 123/569 |

FOREIGN PATENT DOCUMENTS

| | | |
|---|---|---|
| A 5848731 | 3/1983 | Japan . |
| A 62-645 | 1/1987 | Japan . |
| A 62-75025 | 4/1987 | Japan . |
| A 63-50649 | 3/1988 | Japan . |
| A 2191865 | 7/1990 | Japan . |

OTHER PUBLICATIONS

1991 SAE International Congress and Exposition, SAE Paper No. 910252—Development of New Electronically Controlled Fuel Injection System ECD–U2 for Diesel Engines, Feb. 25, 1991, pp. 1–18.

*Primary Examiner*—Carl S. Miller
*Attorney, Agent, or Firm*—Kenyon & Kenyon

[57] ABSTRACT

The present invention provides a fuel-injection control device for a diesel engine which uses a combination of a common-rail-type fuel-injection pump and an EGR control for exhaust gas purification.

In a fuel-injection control device for a diesel engine having a common-rail-type fuel-injection pump comprising a means for controlling fuel-injection pressure according to engine load and an EGR control means for adjusting the EGR ratio according to engine load, where the EGR can be reduced to zero, the means for controlling fuel-injection pressure includes a correcting function to correct the fuel-injection pressure in response to the EGR ratio.

15 Claims, 6 Drawing Sheets

FUEL-INJECTION CONTROL DEVICE FOR A DIESEL ENGINE

This application is a continuation of application Ser. No. 08/227,159, filed on Apr. 13, 1994.

BACKGROUND OF THE INVENTION

1. Field of the Invention

The present invention relates to a fuel-injection control device for a diesel engine, particularly to a fuel-injection control device for a diesel engine using a common-rail-type fuel-injection pump, and in more detail to an optimum control device for the combination between a fuel-injection control and EGR (Exhaust Gas Recirculation) control in a diesel engine using a common-rail-type fuel-injection pump.

2. Description of the Related Art

A common-rail-type fuel-injection pump (also referred hereinafter to "a common-rail-type pump") has recently been developed, which is constructed to inject pressurized fuel from a reservoir, i.e., a so-called common-rail and allows the pressure of the injected fuel to be arbitrarily set and controlled in relation to engine operating conditions such as engine speed, engine load, etc. (see, for example, Japanese Unexamined Patent Publications No. 62-75025 and No. 2-191865). A variety of advantageous methods have been contrived for applying such a common-rail-type fuel-injection pump to a diesel engine. For example, there have been proposed the methods for its utilization such as: the pressure of injected fuel is controlled according to an operating state of the engine and the timing and the interval of fuel-injection are also controlled according to an operating state of the engine (see, for example, Japanese Unexamined Patent Publication No. 62-645); the pressure of injected fuel is controlled on the basis of an engine load (see, for example, Japanese Unexamined Patent Publications No. 62-75025 above-mentioned and No. 63-50649); and so on.

On the other hand, in the purification of exhaust gas of a diesel engine, the engine cannot use a three-way reducing and oxidizing catalyst converter as in a gasoline engine, due to its excess air ratio, but it uses an EGR control for reducing NOx emissions. Practical techniques have yet been elucidated for minimizing the emissions of exhaust gases particularly in the case of combining the fuel-injection control using such a common-rail-type pump with the EGR control. For example, even though the EGR control is simply added to the technique of increasing the pressure of injected fuel as the engine load is increased as described in the above-mentioned Japanese Unexamined Patent Publication No. 62-75025, it will be impossible to produce the minimum amount of NOx, black smoke, PM (Particulate Matter), etc. emissions.

Furthermore, specially in a diesel engine using the EGR control, it is necessary to stop the EGR control when the engine is cold in order to prevent the corrosion of cylinder bores and the like during such an interval. However, there is encountered the problem of a remarkably increased amount of NOx emission if the EGR is off when the engine is cold. With respect to a jerk pump which is widely used in a diesel engine at present and individually mounted for each cylinder of the engine, the only method for suppressing the increase of NOx when the engine is cold is to provide a delay in the fuel-injection timing. The delay in the fuel-injection timing when the engine is cold is, however, not practicable since it brings about an unstable ignition conjointly with a cold combustion chamber, resulting in such disadvantages as the vibration of the engine, the emissions of white smoke and an offensive smell, and so on.

Accordingly, the above-mentioned, proposed control method for a common-rail-type fuel-injection pump is intended to perform an optimum fuel control according to the operational state of the engine so as to prevent the output power of the engine from decreasing and to improve the fuel consumption ratio, but they take no consideration of reducing the emissions of NOx, smoke, etc. Effective methods for utilization of the common-rail-type fuel-injection pump are therefore hardly elucidated with the view of taking advantage of this common-rail-type pump to provide optimum control of a diesel engine combined with purification of the exhaust gas. As described above, particularly in the case of combining a fuel-injection control using this common-rail-type pump with an EGR control, it is an actual fact that any practical technique is not able to minimize the emissions of exhaust gases.

SUMMARY OF THE INVENTION

An object of the present invention is to provide a fuel-injection control device for a diesel engine which allows the engine to be operated in an optimum state, using the above-mentioned common-rail-type fuel-injection pump.

Further in detail, it is another object of the present invention to provide a fuel-injection control device for a diesel engine in which the above-mentioned common-rail-type fuel-injection pump and an EGR control for the purification of exhaust gases are optimally combined and effectively cooperate.

According to the present invention, in a fuel-injection control device for a diesel engine using a common-rail-type fuel-injection pump, comprising a fuel-injection pressure-control means which controls the fuel-injection pressure in response to the engine load and an EGR control means which controls the EGR ratio in response to the engine load, where the EGR can be reduced to zero, the fuel-injection pressure control means includes a correcting means for correcting the fuel-injection pressure according to the EGR ratio.

In the diesel engine with the above-mentioned construction, the fuel-injection pressure is increased as the engine load increases in order to improve the combustion conditions and, with relation to the EGR control for reducing NOx, the EGR ratio is decreased as the engine load increases so as to predominantly increase the engine output. In addition, the correcting means for correcting the fuel-injection pressure according to the EGR ratio allows the emissions of NOx and smoke to be effectively reduced in the whole operational range of the engine by means of complementarily combining the NOx/smoke characteristics in relation to the EGR control, in which NOx is decreased while smoke increases, with the NOx/smoke characteristics in relation to the fuel-injection pressure, in which smoke is decreased while NOx increases.

In preferred embodiments of the present invention, the means for controlling fuel-injection pressure controls to increase the fuel-injection pressure as engine load is increased and the EGR control means provides some actual value of the EGR ratio in the lower-to-middle range of engine load and zero in the higher range of engine load.

Further, the correcting means adjusts the fuel-injection pressure to a higher level when the EGR control is enabled so as to suppress the amount of emitted smoke below the upper limit of smoke emission. Particularly the correcting means adjusts the fuel-injection pressure to a higher level when the EGR control is enabled and to a lower level when the EGR control is disabled.

The correcting means may include a higher pressure control map for adjusting the fuel-injection pressure to a higher level when the EGR control is enabled and a lower pressure control map for adjusting the fuel-injection pressure to a lower level when the EGR control is disabled. The correcting means may also include a calculating means to calculate a correction value for adjusting the fuel-injection pressure to either the higher level or the lower level. In such a case, the calculating means contains a correcting equation determined as a function of engine operation factors.

According to another preferred embodiment of the present invention, in a fuel-injection control device for a diesel engine using a common-rail-type fuel-injection pump and an EGR control, the fuel-injection control device comprises a detecting means for detecting a warming-up state of the engine and a control means for controlling the fuel-injection pressure in the common-rail-type fuel-injection pump and the operation of the EGR control according to the detected warming-up state of the engine, in which the fuel-injection pressure is reduced to a lower level and the EGR control is disabled at least when the engine is cold.

The detecting means may use the cooling water temperature for detecting a warming-up state of the engine, and the control means may include a first control means for disabling the EGR control as well as adjusting the fuel-injection pressure to a lower level and a second control means for enabling the EGR control as well as adjusting the fuel-injection pressure to a higher level.

The first and second control means may also have control maps for adjusting the fuel-injection pressure.

The present invention will be more fully understood from the description of preferred embodiments of the invention set forth below, together with the accompanying drawings.

DESCRIPTION OF THE PREFERRED EMBODIMENTS

Figure 1:
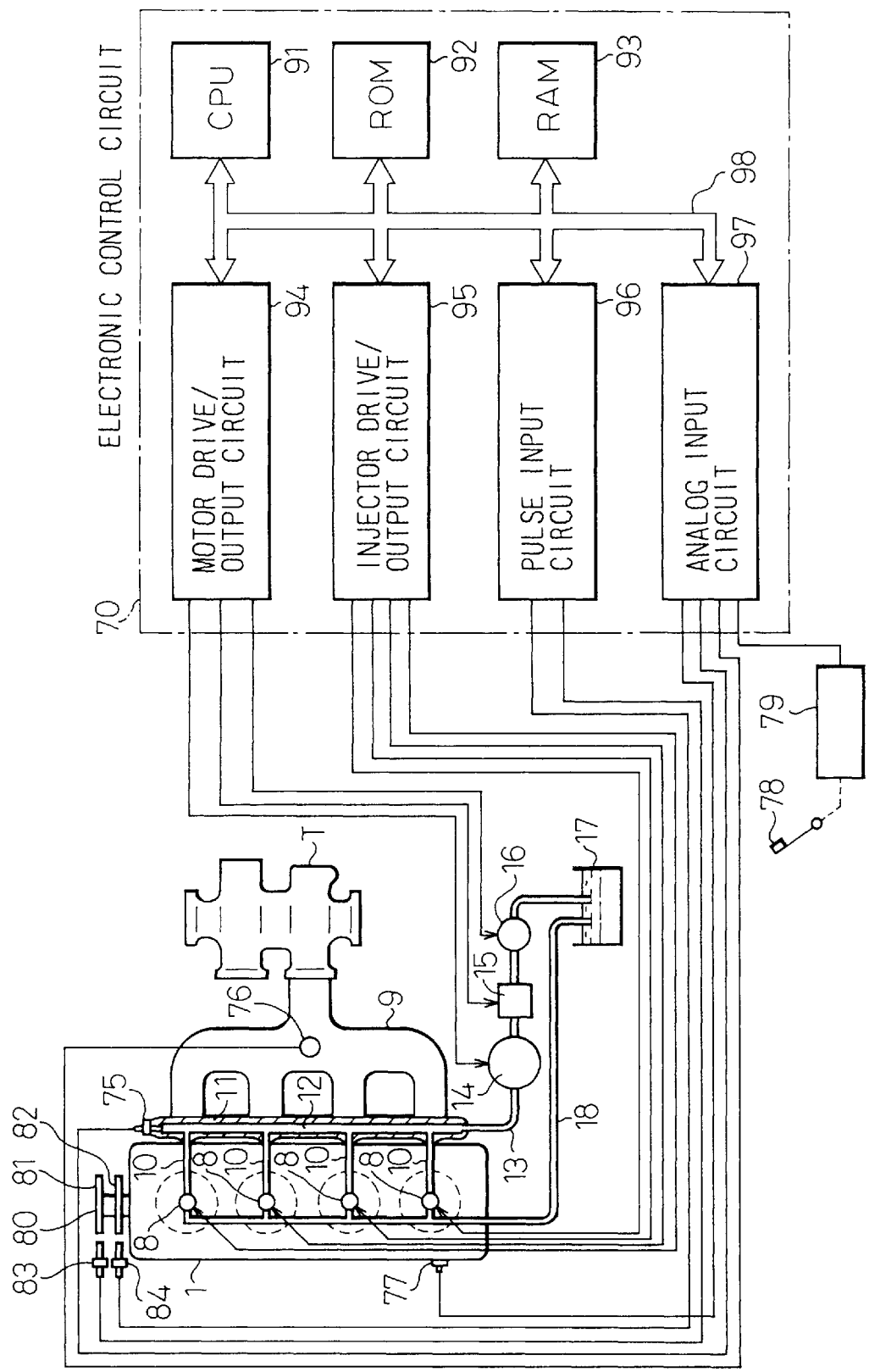
FIG. 1 is a general view of a diesel engine using a common-rail-type fuel-injection pump.
Figure 2:
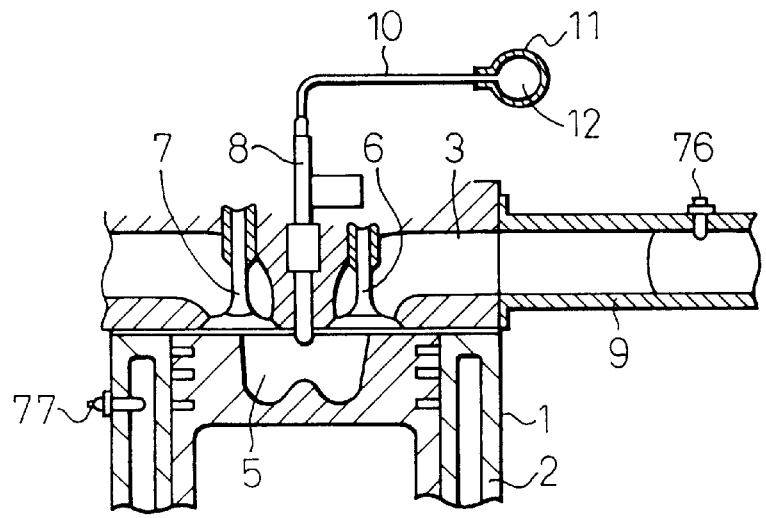
FIG. 2 is a partially sectional view of the diesel engine.

FIG. 1 is a general view of an example of a diesel engine using a common-rail-type fuel-injection pump and particularly shows the schematic construction of an example of the fuel-injection control device thereof. FIG. 2 is a partially sectional view of the diesel engine. A diesel engine 1 includes a cylinder block 2, a cylinder head 3, a piston 4, a combustion chamber 5, an intake valve 6, an exhaust valve 7, a fuel injector 8 mounted in combustion chamber 5 and an intake manifold 9, and the inlet portion of intake manifold 9 is coupled a turbo charger T. Fuel injectors 8 are coupled through a fuel pipe 10 to a fuel reservoir commonly connected with all of the engine cylinders, i.e., a so-called common-rail 11. Common-rail 11 has an internal reserve chamber 12 of a constant volume and the fuel in the reserve chamber 12 is fed to fuel injector 8 through fuel pipe 10.

The reserve chamber 12 is also coupled to the delivery port of a fuel feed pump 14 through a fuel pipe 13, the inlet port of fuel feed pump 14 is coupled to the delivery port of an auxiliary pump 16 through a flow regulating valve 15, and then the inlet port of auxiliary pump 16 is coupled to a fuel reservoir tank 17. Fuel injectors 8 are also coupled to fuel reservoir tank 17 through a fuel feedback pipe 18. Fuel feed pump 14 is designed to deliver highly pressurized fuel and thereby the high pressure fuel is stored in reserve chamber 12. Auxiliary pump 16 may be omitted, if unnecessary.

The fuel is pressurized by fuel feed pump 14, stored in reserve chamber 12 and then directly injected into the engine cylinders through fuel injectors 8, the valve opening operations of which are controlled by an electronic control circuit 70. The outputs of various sensors are inputted to electronic control circuit 70 so as to form control signals for controlling the valve opening operations of fuel injectors 8 according to the fuel-injection timing and the fuel-injection time in response to the operational conditions of the engine. For example, there are shown a fuel pressure sensor 75 located at the end portion of common-rail 11 for detecting the pressure of fuel, an intake air pressure sensor 76 for detecting the intake pressure in intake manifold 9, a cooling water temperature sensor 77 for detecting the temperature of cooling water of the engine, a load sensor 79 for generating an output voltage proportional to the movement of an acceleration pedal 78, crank angle sensors 83 and 84 which are faced to disks 81 and 82 attached to crank shaft 80 of the engine, respectively, and detect the pulse indicating that #1 cylinder, for example, is at the top dead center of intake stroke and the pulse generated each time a given amount of rotation of crank shaft 80, respectively.

Electronic control circuit 70 includes, as shown in FIG. 1, a processing/controlling section containing a CPU 91, a ROM 92 and a RAM 93, and an input/output section containing a motor drive/output circuit 94 for driving and controlling pump motors, an injector drive/output circuit 95 for driving and controlling injectors 8, a pulse input circuit 96 for converting pulse signals from the sensors to digital signals, an analog input circuit 97 for converting analog signals from the sensors to digital signals and a common bus 98 interconnecting them. CPU 91 executes a main control loop for controlling the diesel engine under an optimum operational condition periodically or synchronously with the engine rotation. This main control loop carries out, for example, the following operations. That is, ROM 92 stores in advance various control data such as an amount of fuel-injection for a given engine load, a timing of starting injection and a reference fuel pressure for given engine speed and engine load. The detected signals from various sensors are inputted to RAM 93 at a predetermined timing and then CPU 91 executes necessary arithmetic processings according to those signals and data so as to output the driving signals to fuel feed pump 14, flow regulating valve 15 and auxiliary fuel pump 16 through motor drive/output circuit 94 for the performance of a desired fuel pressure control and to output the driving signal to each fuel injector 8 through injector drive/output circuit 95 for the performance of a desired fuel-injection control.

Figure 3:
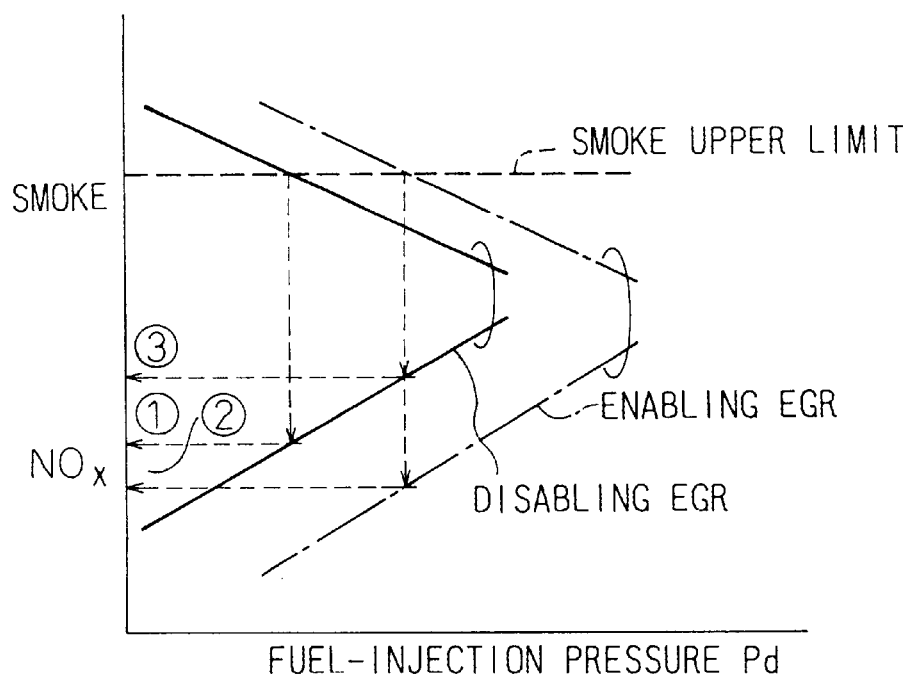
FIG. 3 is a diagram showing the relations between fuel-injection pressure and the amounts of smoke and NOx emissions.

Next, generally regarding a diesel engine with an EGR control, there is illustrated the relation between fuel-injection pressure and the emissions of smoke and NOx under a certain operating condition of the engine in FIG. 3. It shows the relation that NOx increases, but on the contrary smoke decreases as fuel-injection pressure increases, and NOx decreases, but smoke increases when the EGR control is enabled. The emission of smoke, in general, has an upper limit of the emission density, i.e., a smoke upper limit as shown by a dotted line in the figure according to the regulations of the density and the amount of its emission, visual appearance, etc. The fuel-injection pressure is therefore established for the emission of smoke to be set within the smoke upper limit with a view to suppressing the emission of NOx as low as possible. According to this establishment, as apparent from FIG. 3, the emission of NOx is set to the value designated by 1, but the emission of smoke will exceed the smoke upper limit when the EGR control is enabled. In this case, it would be possible to accomplish a lower value 2 of NOx emission if the above-mentioned deterioration of smoke emission due to EGR was compensated for by an increase in fuel-injection pressure.

Furthermore, in the diesel engine established to operate in the above-mentioned state 2 wherein the deterioration of smoke emission due to EGR is compensated for by an increase in fuel-injection pressure, the emission of NOx will be inevitably made worse up to a level designated by 3 in FIG. 3 when the EGR control is stopped when the engine is cold in order to prevent the corrosion of a cylinder bore and the like. Such a large increase of NOx emission must be removed. As mentioned above, providing a delay in fuel-injection timing is conventionally the only method for decreasing the emission of NOx when the engine is cold, but its provision results in a topsy-turvy situation in that a delay in fuel-injection timing is provided although an advance in fuel-injection timing is required since a retention time for ignition is increased due to the decrease in temperature and pressure of compressed air during a cold interval. This brings about more unstable ignition, resulting in vibration of the engine, an increase of rotational variation, a vast emission of white smoke, a deterioration of exhaust gas smell, and so on, due to the unstable combustion caused thereby, so that it is practically impossible to develop a countermeasure.

The present invention then intends to solve the above-mentioned problem relating to EGR by means of combining a diesel engine having an EGR control with a fuel-injection control device using the above-mentioned common-rail-type fuel-injection pump. That is, in a diesel engine established to set fuel-injection pressure Pd so as to keep the emission of smoke within the smoke upper limit and to minimize the emission of NOx when the EGR control is being stopped, the fuel-injection pressure Pd is increased when the EGR control is enabled so as to suppress the emission of smoke to below the smoke upper limit, resulting in shifting the emission of NOx to a state designated by 2 in FIG. 3, and is decreased when the EGR control is stopped during a cold interval of the engine so as to assure a state designated by 1 in FIG. 3, resulting in minimizing the increase of NOx emission. Utilizing the decrease of fuel-injection pressure, in addition, allows the spray penetration to be weakened and then the adhesion of fuel onto the wall of the combustion chamber to be lessened, as well as the spray of fuel to be concentrated at the high-temperature center portion of the combustion chamber, resulting in increasing the suppression of white smoke, the offensive smell and the like.

Additionally, in this case, it is needless to say that an advance in fuel-injection timing practiced in the prior art may be combined with the above-mentioned decreasing of fuel-injection pressure in order to further improve in the suppression of white smoke, offensive smell and the like.

Some preferred embodiments of a fuel-injection control device for a diesel engine according to the present invention will be described hereinafter, referring to the accompanying drawings.

Figure 4:
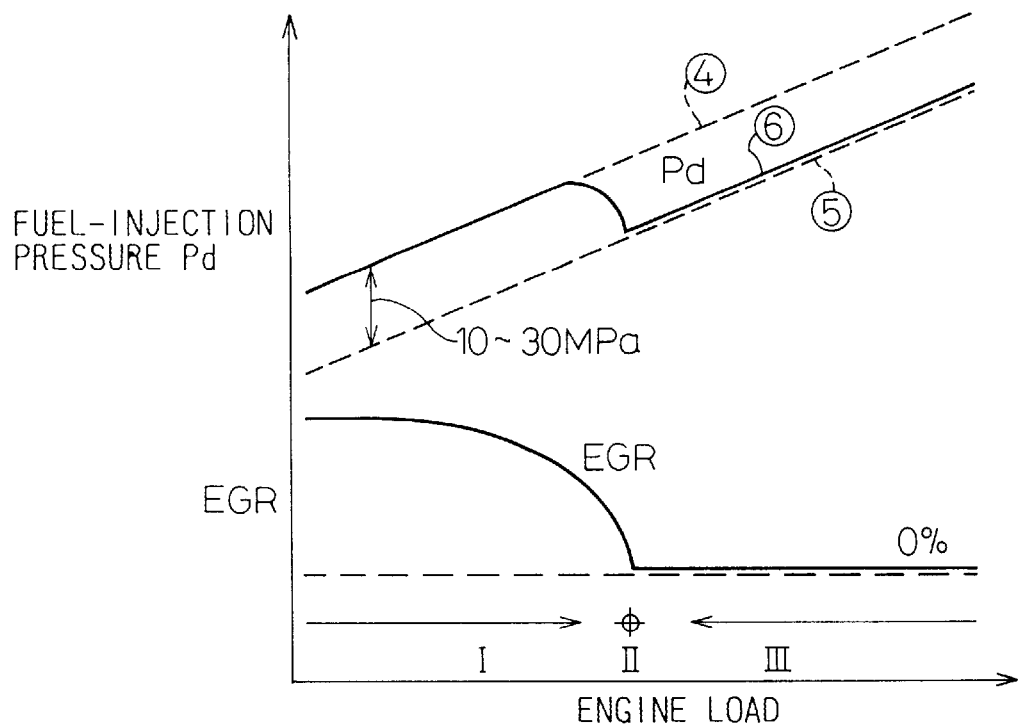
FIG. 4 is a diagram illustrating the control principle in a fuel-injection control device for a diesel engine according to the present invention which has a common-rail-type fuel-injection pump and an EGR control.

FIG. 4 is a diagram illustrating the control principle in a fuel-injection control device for a diesel engine according to the present invention which has a common-rail-type fuel-injection pump and an EGR control, and shows the variations of the fuel-injection pressure Pd of the common-rail-type pump and the EGR ratio according to the engine load, i.e., the amount of fuel-injection. Only for simplification, it is assumed that the EGR ratio according to the engine load (or the amount of fuel-injection) will change to provide a certain level thereof in the below-middle load region I, II and to fall to 0% in the high load region III for operating on a power basis. The fuel-injection pressure Pd is increased as the engine load increases in order that the increase of fuel-injection pressure brings about a fine granulation of spray granularity, an increase of in-take air and a wide diffusion of spray for an improvement of combustion, but it is controlled to decrease as shown in the figure corresponding to the stop of EGR control. The amplitude of this decreasing is, for example, 10–30 MPa depending on the engine load and the engine speed.

Figure 5:
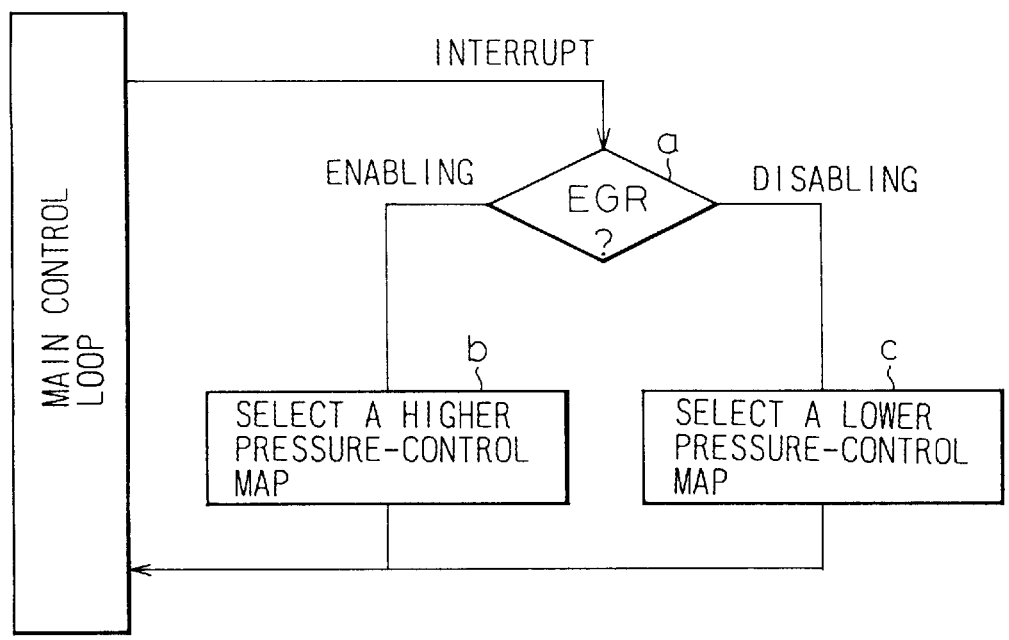
FIG. 5 is a block diagram illustrating a flowchart representing an operational flow in an embodiment of the fuel-injection control device according to the present invention.

FIG. 5 is a flowchart representing an operational flow in an embodiment of a fuel-injection control device for embodying the above-mentioned fuel-injection control principle according to the present invention. In this embodiment, there are provided two kinds of control maps for control during EGR (designated by dotted line 4 in FIG. 4) and during other times (designated by dotted line 5 in FIG. 4) as the fuel-injection control maps for a common-rail-type pump. As mentioned above, it is designated that the pressure in the control map 4 during EGR is 10–30 MPa higher than that in the control map 5 during other times. The flowchart shown in FIG. 5 is designed to interrupt the main control loop for the diesel engine to operate as occasion demands or at a predetermined period. In step a, a judgement is passed on whether the EGR control is enabled or not and, if the EGR control is enabled, the next step b allows a higher pressure control map, i.e., a control map 4 to be selected. On the other hand, if it is determined that the EGR control is not enabled in step a, a lower pressure control map, i.e., a control map 5 is selected in step c so as to lessen the fuel-injection pressure.

Figure 6:
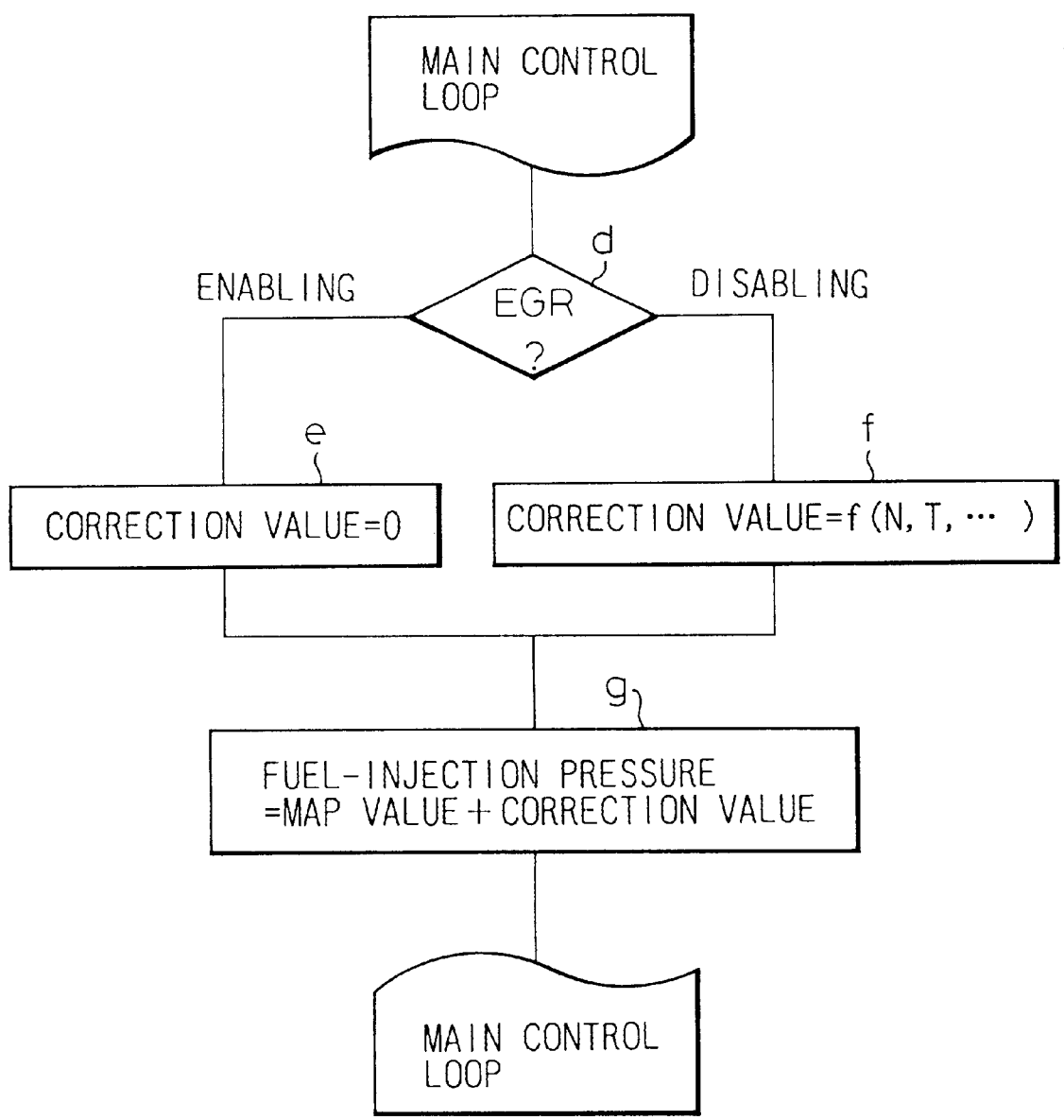
FIG. 6 is a block diagram illustrating a flowchart representing an operational flow in another embodiment of the fuel-injection control device according to the present invention.

FIG. 6 is a block diagram illustrating a flowchart representing an operational flow in another embodiment of a fuel-injection control device according to the present invention. This embodiment employs a method wherein one control map is provided for fuel-injection pressure control, a correcting equation is separately predetermined so as to calculate a pressure correction value according to the condition whether the EGR control is enabled or not, and then the pressure correction value is added to a map value read out from the control map. That is, the flow is designed as a partial routine in the main control loop or an interruption routine to periodically interrupt the main control loop and, at first in operation, a judgement is passed on whether the EGR control is enabled or not in step d and, if the EGR control is enabled, the next step e makes a correction value zero. On the other hand, if step d makes the judgement that the EGR control is not enabled, a correction value is calculated according to a correcting equation f(N,T, . . . ) in step f. The correction value is added to a map value read out from a the control map in step g and then the thus obtained value allows the fuel-injection pressure to be adjusted to a desired value Pd in the main control loop. The correcting equation f in this case is determined as a function of engine operation factors such as engine speed N, accelerator valve opening, engine torque T, etc.

In a further embodiment of a fuel-injection control device according to the present invention, as shown by an EGR curve (illustrated as a continuous line) in FIG. 4, the EGR ratio is gradually decreased as the engine load increases and is set to 0% in the range of more than an appropriate engine load. Simultaneously the fuel-injection pressure Pd is controlled so that it gradually increases as the engine load increases, once drops by 10–30 PMa when the EGR control is stopped and then gradually increases again, as shown by a curve 6 designated by a continuous line in FIG. 4. For the operation of this embodiment, a control map corresponding to the curve 6 is predetermined, and then a desired control value is read out to be acquired according to an operational condition of the engine so that a desired engine control is exercised through a conventional engine control system.

As a variation on this embodiment, it is possible that a fuel-injection pressure-control map when EGR control is disabled is predetermined as the curve 5 shown in FIG. 4 and then the two kinds of the control maps corresponding to the above-mentioned curve 6 and the curve 5, respectively, are selectively used according as the EGR control is enabled or not. A practical control method may be one in the embodiment illustrated in FIG. 5 or FIG. 6.

Figure 7:
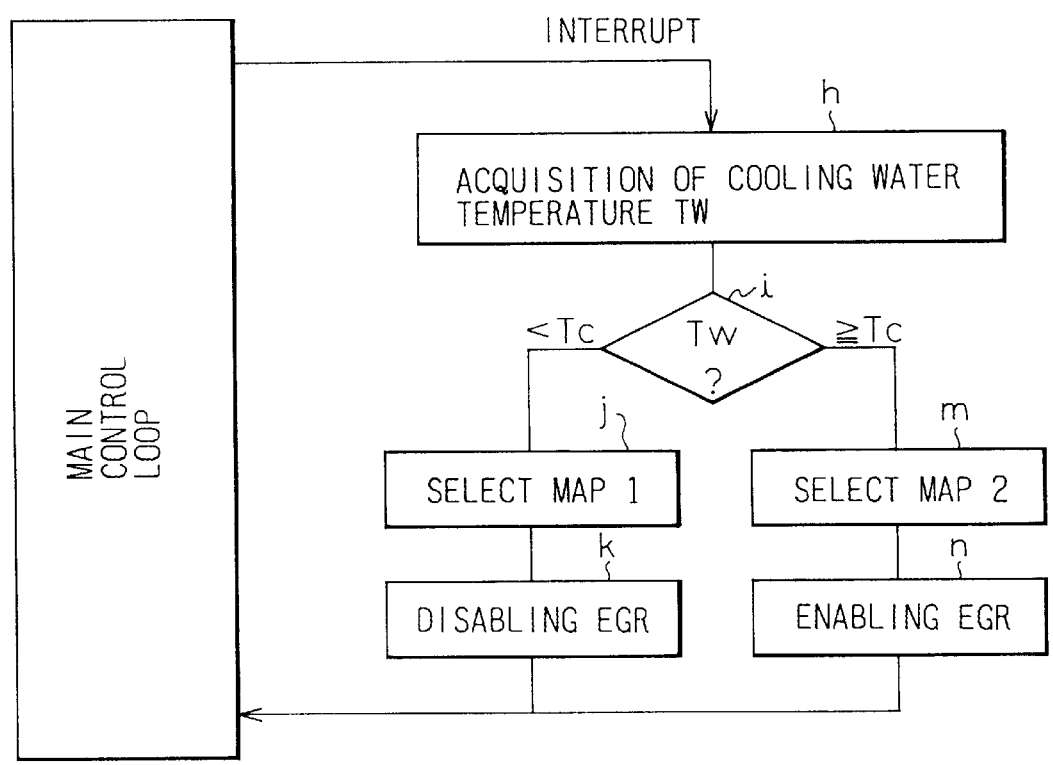
FIG. 7 is a block diagram illustrating a flowchart representing an operational flow in a still further embodiment of the fuel-injection control device according to the present invention.

FIG. 7 is a flowchart representing an operational flow in another embodiment of a fuel-injection control device according to the present invention, which is applied to a diesel engine having an EGR control designed to be stopped when the engine is cold. This embodiment has two kinds of fuel-injection pressure control maps, the one being a control map (control map 2) for providing a fuel-injection pressure to exhibit the best characteristics of exhaust gas, fuel consumption, etc. when EGR control is enabled and the other a control map (control map 1) for providing a fuel-injection pressure, which is set 10–30 PMa lower than the former, to exhibit the best engine characteristics when EGR control is disabled. Those control maps may be, for example, the ones corresponding to the curve 4 and the curve 5 (or the curve 6), respectively.

The flowchart of FIG. 7 is designed as an interrupt routine to the main control loop and, at first in its operation, the quantity to represent a warming-up state of the engine is acquired in step h. Here, a cooling water temperature Tw is used as an indication of the warming-up state. Next, this cooling water temperature Tw is compared with a predetermined value Tc in step i. If cooling water temperature Tw is lower than Tc, it indicate a cold state of the engine, and then step j allows a control map for lower fuel-injection pressure, i.e., map 1 to be selected. Simultaneously EGR is reset in step k and then the routine is finished to return to the main control loop. On the other hand, if cooling water temperature Tw is higher than Tc, it indicates the complete of warming-up the engine, and then EGR is set in step n, as well as a control map for higher fuel-injection pressure, i.e., map 2 is selected in step m, being followed by the return to the main control loop. Accordingly, even though EGR control is disabled when the engine is cold, fuel-injection pressure Pd will be lessened to eliminate a surging increase in the amount of NOx emission, for example, as shown by 3 in FIG. 3, resulting in suppressing smoke to below the upper limit and the amount of NOx emission down to a level shown by 1 in FIG. 3.

In this embodiment, it may be possible to use another parameter than cooling water temperature Tw for detecting the warming-up state of the engine and also possible to use another means, e.g., a calculating equation as shown in FIG. 6, instead of the maps 1 and 2.

Figure 8A:
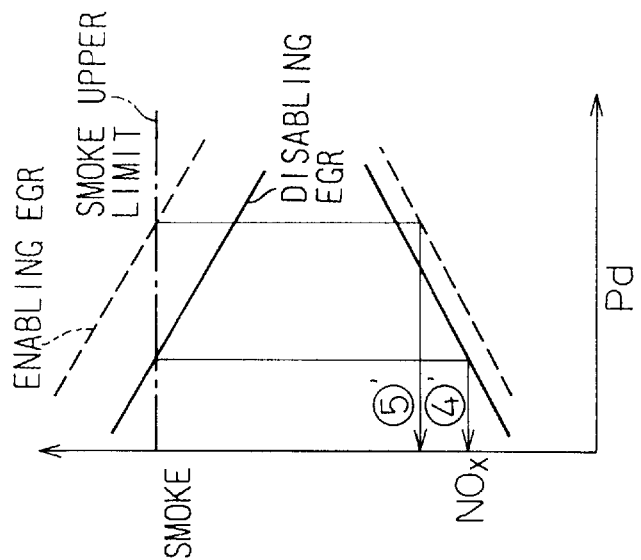
FIGS. 8(A), 8(B) and 8(C) illustrate fuel-injection pressure vs. smoke and NOx emissions characteristics in a fuel-injection control device for a diesel engine according to the present invention.
Figure 8B:
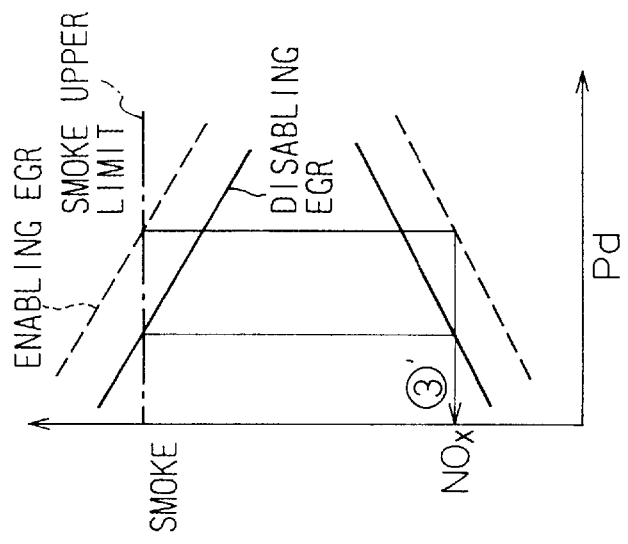
Figure 8C:
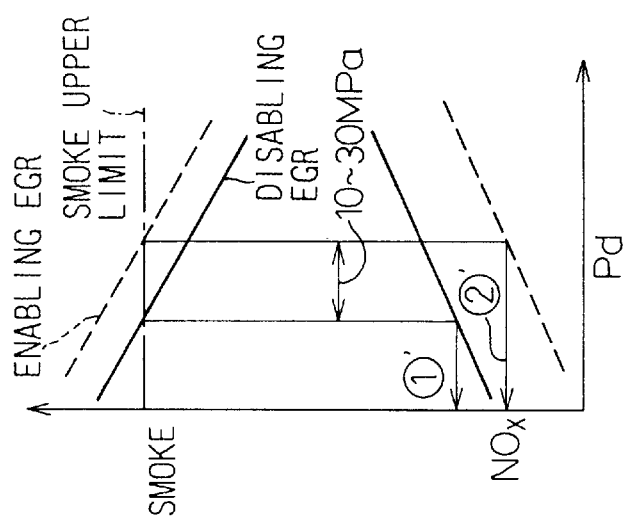

FIGS. 8(A), 8(B) and 8(C) illustrate fuel-injection pressure vs. smoke and NOx emissions characteristics in a fuel-injection control device for a diesel engine according to the present invention. In the figures, continuous lines indicate the operational characteristics during disabled EGR control and dotted lines indicate the operational characteristics during enabled EGR control. FIG. 8(A) shows the operational characteristics in the lower-to-middle load region I of FIG. 4, FIG. 8(B) the operational characteristics in the middle load region II and FIG. 8(C) the operational characteristics in the middle-to-high load region III. An alternate long and short dash line indicates the smoke upper limit in the figures.

In the lower-to-middle load region, as shown in FIG. 8(A), a value 1' gives the amount of NOx emission set based on the smoke upper limit when EGR is disabled. Fuel injection pressure Pd is increased by 10–30 PMa when EGR is enabled so as to cope with an increase of smoke, and the reduction of NOx emission down to a level 2' is thus accomplished due to the EGR control.

In the middle load region, as shown in FIG. 8(B), the NOx value remains at a level 3', though the optimum fuel-injection pressure is changed according that the EGR control is on or off. Since there is hardly any advantage in reducing NOx emission by the EGR control in this region, the EGR control is usually disabled.

In the middle-to-higher load region, as shown in FIG. 8(C), an increase of smoke caused by the EGR control becomes excessively large, and therefore, the NOx value 5' when EGR is enabled will be, on the contrary, larger than the NOx value 4' during off-EGR. As a result, the EGR control is disabled due to lack of merit.

Although the embodiments of the present invention employ a turbo-charger-compound diesel engine as shown in FIG. 2, i.e., a turbo engine, it may be possible to apply the present invention to an engine without a turbo charger.

As mentioned above, the fuel-injection control device according to the present invention allows the emissions of smoke and NOx to be minimized over the whole range of engine operation. Consequently the present invention is a method for effectively utilizing a common-rail-type fuel-injection pump and provides an advantageous diesel engine giving an improvement in the performances for engine operation with an improvement in exhaust gas purification.

In addition, particularly according to the fuel-injection control device of the present invention, a surging increase of NOx emission is effectively eliminated in the case of stopping the EGR control in a diesel engine.

We claim:

1. A fuel-injection control device for a diesel engine having a common-rail-type fuel-injection pump comprising:

an EGR control means for adjusting an EGR ratio, between zero and a maximum EGR ratio, according to an engine load;

a means for controlling fuel-injection pressure based on the EGR ratio and the engine load, so that a previously calculated amount of fuel is injected at the pressure determined by the fuel-injection pressure control means thereby reducing an amount of smoke and $NO_x$ generated through combustion of the fuel, wherein said means for controlling fuel-injection pressure includes a correcting means for correcting said fuel-injection pressure in response to said EGR ratio.

2. A fuel-injection control device as set forth in claim 1, wherein said means for controlling fuel-injection pressure controls to increase said fuel-injection pressure as the engine load increases.

3. A fuel-injection control device as set forth in claim 1, wherein said EGR control means provides some actual value of said EGR ratio in the lower-to-middle range of engine load and zero in the higher range of engine load.

4. A fuel-injection control device as set forth in claim 1, wherein said correcting means adjusts said fuel-injection pressure to a higher level when said EGR control is enabled so as to suppress the amount of emitted smoke to below the upper limit of some emission.

5. A fuel-injection control device as set forth in claim 1, wherein said correcting means adjusts said fuel-injection pressure to a higher level when said EGR control is enabled and to a lower level when said EGR control is disabled.

6. A fuel-injection control device as set forth in claim 5, wherein said correcting means selects a higher pressure control map for adjusting said fuel-injection pressure to a higher level when said EGR control is enabled and a lower pressure control map for adjusting said fuel-injection pressure to a lower level when said EGR control is disabled.

7. A fuel-injection control device as set forth in claim 5, wherein said correcting means includes a calculating means to calculate a correction value for adjusting said fuel-injection pressure to either said higher level or said lower level and to add said correction value to a pressure control map for the other level.

8. A fuel-injection control device as set forth in claim 7, wherein said calculating means contains a correcting equation determined as a function of engine operation factors.

9. A fuel-injection control device as set forth in claim 5, wherein the difference between said higher level and said lower level is 10–30 PMa.

10. In a fuel-injection control device for a diesel engine using a common-rail-type fuel-injection pump and an EGR control, said fuel-injection control device comprising:

a detecting means for detecting a warming-up state of said engine, and a control means for controlling the fuel-injection pressure in said common-rail-type fuel-injection pump and the operation of said EGR control according to said detected warming-up state of said engine, in which said fuel-injection pressure is lessened to a lower level and said EGR control is disabled at least when said engine is cold.

11. A fuel-injection control device as set forth in claim 10, wherein said detecting means uses cooling water temperature for detecting a warming-up state of said engine.

12. A fuel-injection control device as set forth in claim 10, wherein said control means includes a first control means for disabling said EGR control as well as adjusting said fuel-injection pressure to a lower level and a second control means for enabling said EGR control as well as adjusting said fuel-injection pressure to a higher level.

13. A fuel-injection control device as set forth in claim 12, wherein at least one of said first and second control means contains a control map for adjusting said fuel-injection pressure.

14. A fuel-injection control device for a diesel engine having a common-rail-type fuel-injection pump comprising:

fuel-injection amount calculation means for determining a fuel injection amount based on an engine load;

an EGR control means for adjusting an EGR ratio according to engine load between zero and a maximum EGR ratio;

a controller for controlling a pressure at which fuel is to be injected based on the current EGR ratio and the engine load; and fuel-injection timing means for determining, based on the fuel-injection amount and the fuel-injection pressure, a duration for which fuel is to be injected, so that, for a given fuel-injection amount, a change in the EGR ratio results in a change in the fuel injection pressure and duration.

15. A diesel engine comprising:

a common-rail fuel-injection pump, for injecting fuel directly into at least one cylinder of the engine;

an intake passage for supplying air to the at least one cylinder;

an exhaust gas recirculation passage for recirculating exhaust gas from the engine back to the intake passage;

an EGR controller for adjusting an EGR ratio, according to an engine load, between zero and a maximum EGR ratio;

a fuel quantity controller for controlling a quantity of fuel to be injected to the at least one cylinder based on engine operating conditions;

a pressure controller for controlling the pressure at which the quantity of fuel is injected based on the engine load and a diffusion characteristic of the injected fuel and the air from the intake passage to reduce an amount of smoke and $NO_x$ generated through combustion of the fuel, wherein the pressure controller corrects the fuel-injection pressure based on the EGR ratio.

* * * * *

UNITED STATES PATENT AND TRADEMARK OFFICE
CERTIFICATE OF CORRECTION

PATENT NO.   : 5,908,022
DATED        : June 1, 1999
INVENTOR(S)  : Sigeru Aoki, et. al.

It is certified that error appears in the above-identified patent and that said Letters Patent is hereby corrected as shown below:

Title page, item [73] Assignee, should read -- Toyota Jidosha Kabushiki Kaisha, Aichi, Japan --.

Title page, item [30] Foreign Application Priority Data, should read -- Apr. 16, 1993   [JP]   Japan...............................5-90081 --.

Signed and Sealed this

Thirtieth Day of May, 2000

Attest:

Q. TODD DICKINSON

*Attesting Officer*             *Director of Patents and Trademarks*